March 24, 1970     W. G. LOYE     3,502,198

RETRACTABLE CLEAT

Filed May 1, 1968     2 Sheets-Sheet 1

INVENTOR.
WILLIAM G. LOYE
BY
ATTORNEYS

March 24, 1970   W. G. LOYE   3,502,198
RETRACTABLE CLEAT

Filed May 1, 1968   2 Sheets-Sheet 2

INVENTOR.
WILLIAM G. LOYE
BY
ATTORNEYS

United States Patent Office 3,502,198
Patented Mar. 24, 1970

3,502,198
RETRACTABLE CLEAT
William G. Loye, 3266 Rickman, NE.,
Grand Rapids, Mich. 49505
Filed May 1, 1968, Ser. No. 725,780
Int. Cl. B65g *17/04*
U.S. Cl. 198—153                                    10 Claims

ABSTRACT OF THE DISCLOSURE

This invention is directed to a power driven conveyor having an endless member of the wide belt or web type which, as it makes its upper or operative run, automatically forms article carrying pockets. The web is equipped with spaced cross rods or stiffeners, the ends of selected ones of which are attached to chains which move the web along the upper run, the remaining rods are guided to a second track, which track is located below that along which the chain travels, thereby forming the web into pockets. The terminal pulleys for the web and the terminal sprockets for the chains have a radial relationship such that the excess in length of the web over that of the chains is taken up forming a flat surface at the conveyor's discharge end. These pulleys are also equipped with a compressible material permitting the rods to become embedded therein so that the top surface of the web is smooth as it passes around the pulley.

BACKGROUND OF THE INVENTION

While the invention obviously has other applications, it is particularly intended for use in connection with check-out counters of supermarkets. The conveyor elevates the articles from a lower basket unloading or other type of receiving station to the level of the check-out counter. Various types of conveyors have been used for this purpose but none of them have proven satisfactory. The nature of the articles to be transported creates serious problems. The articles vary widely in size—from packages ¼ inch square and 1 inch long to a 50 pound bag of pet food. Many of the articles are round and thus tend to roll. Others are fragile or crushable such as eggs or food packed in glass. Some of the articles are thin and flexible such as small pamphlets. All of these sizes, shapes and types have to be handled without loss or damage.

Because of the nature of the articles, the conveyor must have a soft surface to eliminate denting or breakage of the articles. It also must have pockets of limited size so that only a limited number of articles are carried in each pocket. Once again, this is to prevent damage or injury.

The pockets must be of such a shape that they positively restrain the articles from sliding or rolling backward down the conveyor as the articles are being elevated.

At the upper end of the conveyor, it is necessary to automatically discharge the articles without the intervention of an operator. This requires the surface of the web be straightened out to a flat, smooth surface which will not entrap even the smallest of the articles. This is also essential in order to use a doctor blade sufficiently close to the surface of the web to positively remove even the small, thin and flexible articles. Each of these requirements are ones which have not been properly met by the prior art devices.

Since the device is used in a public area where customer relationships are most important, it is essential that the nature of the conveyor be such that it presents a neat and clean appearance and operates quietly. It is also essential that it operate dependably, since delays due to malfuction are frustrating to the customers, and the delays attendant in check-out procedures of supermarkets have always been a source of frustration and irritation to many customers.

SUMMARY OF THE INVENTION

Basically the conveyor consists of a pair of side panels at opposite ends of which are terminal pulleys. An endless flexible web is mounted between the pulleys. At spaced intervals, the web has cross members or bars. Certain of these bars arranged at evenly spaced intervals have their ends attached to a pair of endless chains, one one each side of the web. These chains pass over sprockets mounted on a common shaft with the terminal pulleys. The chains provide the power source by which the web is made to travel its circular path. Along the upper or operating run of the chains and web, the chains travel along and are supported by an upper track between the sprockets at each end. Auxiliary rods are provided between those rods and are attached to the chains. The ends of the auxiliary rods are not attached to the chains and are shorter so that they will pass between the chains. As the web passes around the lower of the terminal pulleys and enters the upper or operating run, the auxiliary rods, by their weight, drop and are caught beneath a lower track which holds them in a position spaced well below the planes of the chains. This forms pockets in the conveyor. As the web approaches the upper or discharge end of the conveyor, the rods forming the bottoms of the pockets are released from the lower track and they are supported from beneath by guide tracks. By virtue of the fact that the diameter of the pulley is substantially greater than that of the web necessary to form the pockets is taken up and the web is flattened out as it approaches and passes over the upper pulley. Thus, the web is formed into a flat surface from which the articles can be removed.

All of the rods are secured to the web on the inside surface whereby they do not form ridges in the outer or upper surface of the web. The terminal pulleys are equipped with a soft, compressible covering into which the rods will automatically embed as they pass around the pulley. This eliminates the formation of ridges by the rods as they pass around the pulley, permitting a doctor blade to be used which is so close to the surface of the web that it will positively remove all articles at the upper end of the conveyor.

DESCRIPTION OF THE PREFERRED EMBODIMENTS

Figure 1:
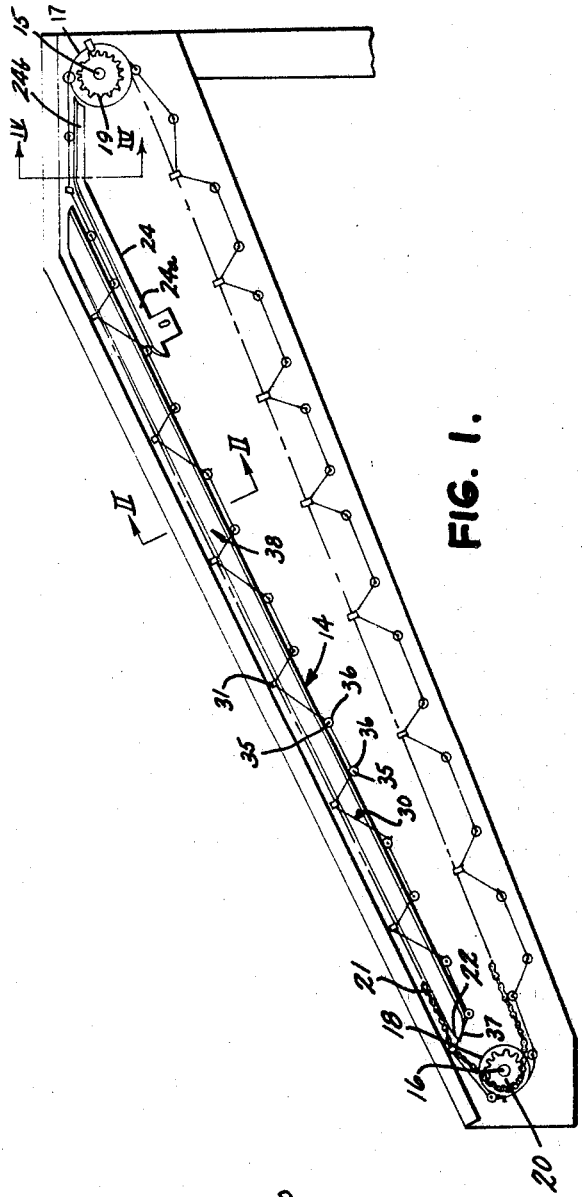
FIG. 1 is a schematic sectional elevation view of a conveyor embodying this invention.

Referring now to FIGS. 1 through 4, the conveyor 10 has a pair of side panels 11 and 12. Each side panel has a shelf-like offset forming an upwardly facing track surface 13 (FIGS. 1 and 2), and a lower track 14 formed by an angle having its horizontal leg along its lower edge. At the upper and lower ends of the conveyor are transverse shafts 15 and 16, respectively. These shafts mount terminal pulleys 17 and 18, respectively. The upper shaft mounts a pair of sprockets 19 and the lower shaft a pair of sprockets 20.

On each side of the conveyor 18 is an endless tension member, in the drawings illustrated as a chain 21. It will be recognized that a tension member having adequate strength and flexibility such as a cable may be substituted for the chain. These chains pass over the sprockets 19 and 20 at each end of the conveyor, and along their upper run, are supported on the track 13 for a major portion of their travel between the sprockets. The track 13 at its lower end has a short inclined ramp 22 to guide the chain onto the upper track 13 (FIG. 1). Track 13 terminates a substantial distance ahead of the upper pulley 17, and its terminal portion forms a ramp 23 which effects a transition from the inclined main portion of the track to a short level portion immediately ahead of the pulley 17. In the same area, a guide track 24 is provided below the lower track 14 having a lower, inclined portion 24a and an upper level portion 24b approximately in the plane of the level portion of the ramp 23. The purposes of this arrangement will be understood from the subsequent description.

Figure 5:
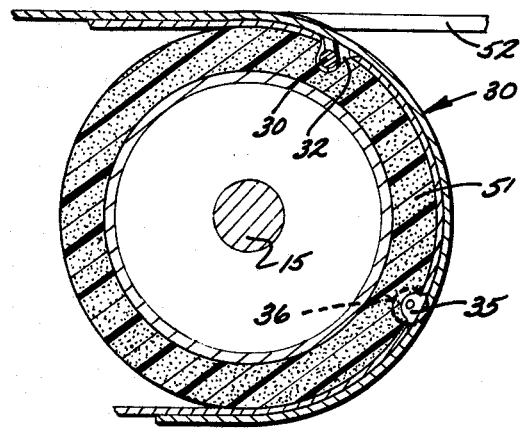
FIG. 5 is a sectional elevation view taken along the plane V—V of FIG. 4.

Trained over the two pulleys is an endless flexible web 30. At spaced intervals, a rigid rod-like member 31 is secured to the under surface of the web, preferably by being embedded in a plastic or rubber boss 32 as indicated in FIG. 5. The arrangement is such that the upper surface of the belt is smooth with the rod located in a plane well below the lower face of the belt. The rod 31 may be of any suitable material such as steel, aluminum, or even of a rigid, high strength plastic.

Figure 2:
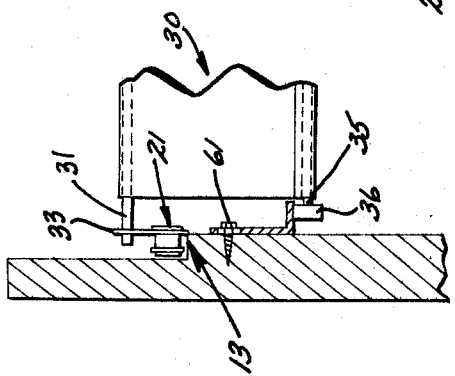
FIG. 2 is a fragmentary enlarged sectional elevation view taken along the plane II—II of FIG. 1.
Figure 4:
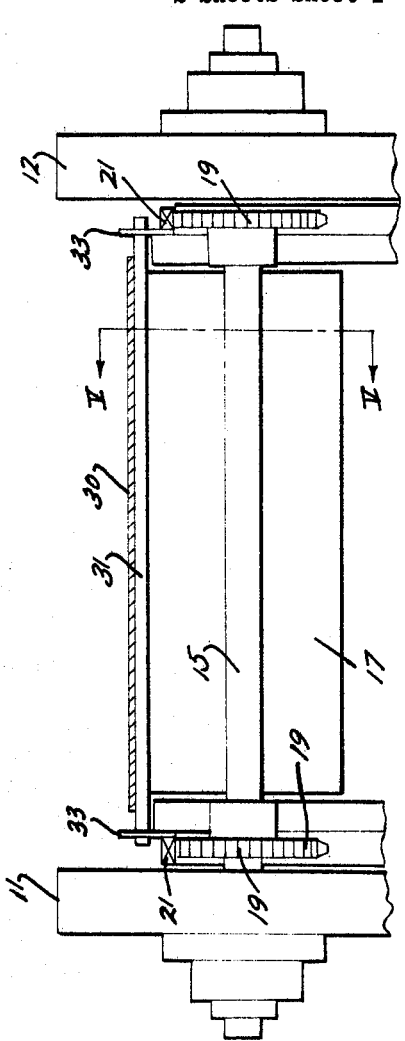
FIG. 4 is a fragmentary sectional elevation view taken along the plane IV—IV of FIG. 1 with the guide rail for the auxiliary rods removed.

The ends of the rods 31 project beyond the web and are mounted to up-standing ears 33 which in turn, are provided on certain ones of the links of the chain 21 (FIGS. 2 and 4). Between the rods 31, similar but shorter rods 35 are secured in the same manner to the under surface of the web 30. These rods have a roller 36 on each end for engaging the under surface of the lower track 14 (FIG. 2). While the presence of the roller is not essential, it is preferable to reduce noise and wear and to make the conveyor operate with less friction and drag.

Figure 6:
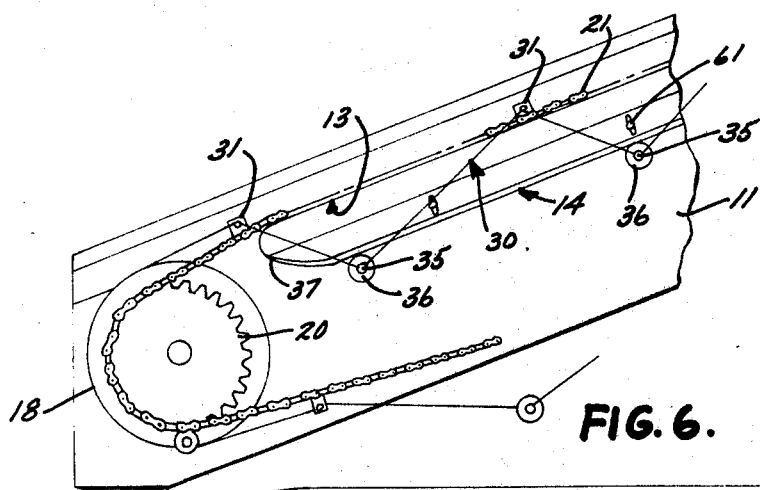
FIG. 6 is a somewhat schematic, fragmentary, sectional elevation view showing a modified form of the invention.

In one form of the invention, a pair of the rods 35 are provided between each pair of the rods 31. In a modified embodiment of the invention, only a single rod 35 is provided between each pair of the rods 31 (see FIG. 6). As the chains 21 pass around the lower sprockets 20, they are guided onto the upper track 13 by the ramp 22. Since the web 30 is secured to the rods 31, it is supported and moved by the rods 31. As the chains continue to draw the web off the lower pulley 18, the intermediate rods 35 thus disengage the pulley, by their weight, drop and thus get caught beneath the entry ramp 37 for the lower track 14 (see FIGS. 1 and 6). Thus, the rods 31 and 35 become vertically spaced, forming a pocket 38 in the web, the lower portion of which will be sufficiently inclined to the vertical to entrap articles which are in the pocket. This prevents them from rolling down the conveyor as it traverses its upwardly inclined path.

By reason of the existence of the upper and lower tracks, the size and shape of these pockets are maintained as the web moves up the conveyor until the area of the ramp 23 is reached. At this point, the travel of the chain 21 ceases to be inclined and becomes basically horizontal. At the same time, the lower track continues upwardly until it is in or almost in the plane of the chain. However, before it reaches this point, the wheels 36 on the ends of the rods 35 have engaged the guide ramp 24 and, thus, are supported from beneath. As the wheels 36 emerge from between the lower track 14 and the guide track 24, the guide track 24 flattens out to become substantially horizontal and, thus, the pockets are eliminated and the web becomes a flat member. The articles will not roll back down the conveyor at this point, since the inclination of the conveyor has ceased before the pockets are eliminated. It is also possible to make this portion of the web inclined slightly downwardly toward the upper terminal pulley 17 and, thus, eliminate any possibility of the articles having a tendency to roll back down the conveyor.

Figure 7:
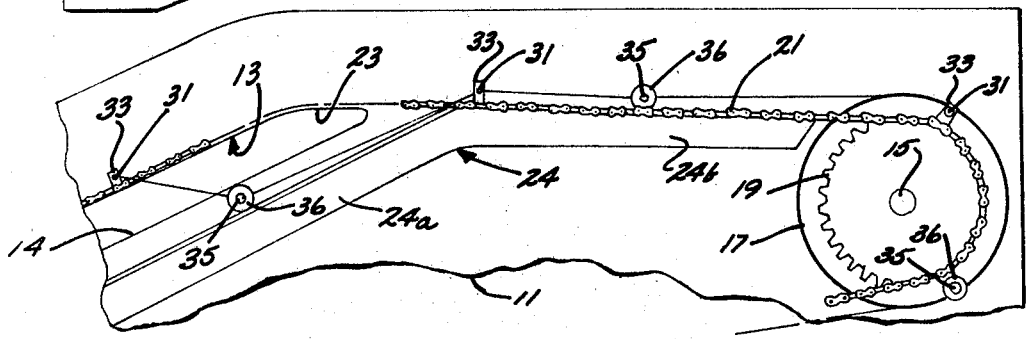
FIG. 7 is a somewhat schematic fragmentary sectional elevation view showing the upper end of the conveyor as the web straightens out to pass over the upper or discharge pulley.

It is obvious from the drawings and the preceding description that the length of the web 30 is substantially greater than the length of the chains 21. This has to be accounted for, if the web is to be stretched out into a flat surface as it approaches the discharge or upper end of the conveyor. This is accomplished by passing the chains over sprockets, the pitch diameter of which is substantially less than the surface diameter of the pulley over which the web passes. The difference in the effective diameters of the sprockets and of the pulley is such that the web is stretched flat as it passes around the pulley and thus takes up the slack in the web which is represented by the differences in length between the web and the chains between each pair of the rods 31. The ears 33 on chains are of such length that the web will be supported at the surface of the pulley. Thus, their length represents the difference in radius between the sprockets and the pulley necessary to take up the slack in the web. Once the chains and the web have passed around the upper pulley 17, the pockets reform by gravity, but in a reversed direction, and travel in this manner until the web is once more fully or partially straightened out as it passes around the lower pulley 18 to re-enter the upper run. This arrangement is best seen in FIG. 7.

FIG. 5 illustrates the construction of the pulley 17. The main body 50 of the pulley is conventional and consists of a suitable rigid shell such as aluminum or steel mounted on the shaft 15. This shell is covered with a thick layer 51 of soft, compressible material such as sponge rubber. The durometer of this material is such that the rods 31 and 35 and their mounting bosses 32 will embed themselves in the compressible material leaving the surface of the web flat. This is essential to permit the docter blade 52 to be located very close to the surface of the web whereby it can positively remove all of the articles on the web. The use of the compressible material 51 is possible under these circumstances since the pulley 17 does not pull the web because the tension members which move the web and carry the load are the chains 21. The power is delivered to the chains by any suitable means driving the shaft 15 for the upper sprockets.

Figure 3:
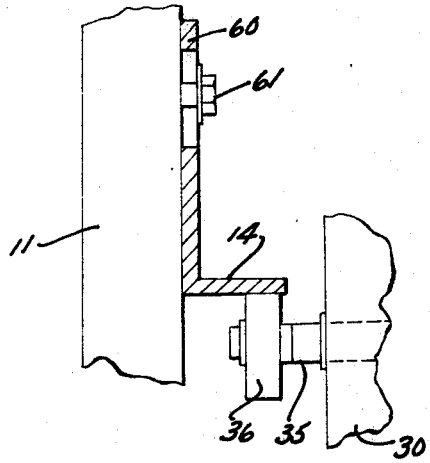
FIG. 3 is a further enlarged fragmentary sectional view showing the lower track of the conveyor.

As is indicated in FIG. 3, the lower rail 14 is made vertically adjustable by means of slots 60 and fasteners 61. Thus, it can be adjusted to take any stretch in the web or small manufacturing tolerances. If it is desired to support the chains during their lower run, the ends of the rods 31 may be extended so that they will seat on a suitable supporting rail as they traverse the lower run. This, however, would be conventional in any conveyor, and therefore, its illustration here is not considered necessary.

It will be seen that this invention provides an automatic pocket forming conveyor which will positively trap articles of various sizes, shapes and conditions in individual pockets so that they may be elevated to a suitable height. The invention also automatically eliminates the pockets to permit the articles to be discharged from a flat, smooth surface. The simplicity of the construction permits this unit to be used over a long period of time with minimum maintenance and assurance of dependability.

It will be recognized that whether one or two rods 35 are used between each pair of the rods 31 to form the pockets is a matter of choice, once the principles of this invention have been applied. It will also be recognized that the rods 35 may be located such as to form pockets, the lower walls of which are either steeply inclined or only inclined at a shallow angle. This is determined by the spacing between the lower or downstream one of each of the pairs of rods 31, and the adjacent upstream rod 35 which forms the bottom of the pocket and the lower corner of the downstream wall of the pocket. This adds considerable flexibility to the design of the conveyor to fit particular individual needs under differing operational circumstances.

While a preferred embodiment and a modification of this invention have been described, it will be recognized that other modifications of this invention may be made without departing from the principles of the invention. Such of these modifications as incorporate the principles of the invention are to be considered as included within the appended claims unless these claims, by their language, expressly state otherwise.

The embodiments of the invention in which an exclusive property or privilege is claimed are defined as follows:

1. In a pocket forming conveyor having a pair of side frame members; a pair of pulleys, one at each end and an endless flexible article transporting member mounted on said pulleys between said side frame members and having an upper run and a lower run, the improvement comprising: a plurality of first rigid cross members and a plurality of second rigid cross members all secured to said flexible member at spaced intervals and extending laterally thereof; said second cross members being interspaced between said first cross members; said frame members having a pair of vertically spaced guide tracks extending lengthwise thereof between said pulleys; said first cross members travelling the upper one of said guide tracks as said flexible member moves between said pulleys along its upper run; the lower one of said guide tracks engaging the ends of said second cross members as said flexible member moves between said pulleys along its upper run whereby said flexible member is formed into concave pockets as it travels along its upper run.

2. The pocket forming conveyor described in claim 1 wherein the ends of said first cross members are connected by an endless tension mmeber; a pair of sprockets associated with the pulley at the discharge end of said conveyor, said sprockets having a diameter less than that of the pulley such that the length of the circumferential path travelled by the article transporting member about said pulley exceeds the length of the path travelled by said endless tension member around said sprockets by a distance equal to the length of said article transporting member utilized to form the pockets between those of the cross members travelling said upper track.

3. The pocket forming conveyor described in claim 2 wherein said tension member has upstanding fingers thereon supporting said first cross members and spacing said first cross members above said tension member.

4. The pocket forming conveyor described in claim 1 wherein the pulley at the discharge end of said conveyor has a surface of compressible material into which both said first and second cross members are embedded as they travel around said pulley.

5. A pocket forming conveyor as described in claim 1 wherein means is provided adjacent the pulley at said discharge end of said conveyor for engaging the ends of said second cross members and guiding said tension member into a generally horizontal plane tangent to the surface of said pulley at said discharge end.

6. The pocket forming conveyor described in claim 1 wherein said lower guide track has a downwardly inclined ramp at its lower end for engaging said second cross members and guiding them into engagement with said lower track.

7. The pocket forming conveyor described in claim 1 wherein said first and second cross members are arranged alternately.

8. The pocket forming conveyor described in claim 1 wherein a pair of said second cross members are provided between each pair of said second cross members.

9. The pocket forming conveyor described in claim 1 wherein said cross members are each secured to the inside face of said tension web.

10. The pocket forming conveyor described in claim 9 wherein bosses are secured to the inside face of said web member for mounting said cross members and supporting said cross members spaced from the inside surface of said tension member.

References Cited

FOREIGN PATENTS 1,083,768   1/1955   France.

EDWARD A. SROKA, Primary Examiner